United States Patent
Yazawa

(10) Patent No.: US 9,787,903 B2
(45) Date of Patent: Oct. 10, 2017

(54) STAGE APPARATUS, IMAGE-SHAKE CORRECTION APPARATUS AND ELECTRONIC APPARATUS

(71) Applicant: RICOH IMAGING COMPANY, LTD., Tokyo (JP)

(72) Inventor: Kazuki Yazawa, Tokyo (JP)

(73) Assignee: RICOH IMAGING COMPANY, LTD., Tokyo (JP)

( * ) Notice: Subject to any disclaimer, the term of this patent is extended or adjusted under 35 U.S.C. 154(b) by 57 days.

(21) Appl. No.: 14/841,985

(22) Filed: Sep. 1, 2015

(65) Prior Publication Data

US 2016/0072998 A1   Mar. 10, 2016

(30) Foreign Application Priority Data

Sep. 9, 2014  (JP) .................... 2014-183150

(51) Int. Cl.
*H04N 5/232* (2006.01)
*H01F 7/06* (2006.01)

(52) U.S. Cl.
CPC ............ *H04N 5/2328* (2013.01); *H01F 7/06* (2013.01); *H04N 5/23258* (2013.01)

(58) Field of Classification Search
CPC ............ H04N 5/2328; H04N 5/23258; H04N 5/23248; H04N 5/2329; H04N 5/23251; H04N 5/144; H04N 5/145; H04N 5/23261; H04N 5/23264; H01F 7/06; G03B 2217/005; G03B 2205/0007; G03B 2207/005; G06T 7/20; G08B 13/19602; G09G 2320/106; G02B 27/646
See application file for complete search history.

(56) References Cited

U.S. PATENT DOCUMENTS 7,639,933 B2   12/2009   Seo et al.
7,826,732 B2   11/2010   Enomoto
(Continued)

FOREIGN PATENT DOCUMENTS

JP   2005-184122   7/2005
JP   2011-081417   4/2011
(Continued)

*Primary Examiner* — Mekonnen Dagnew
(74) *Attorney, Agent, or Firm* — Greenblum & Bernstein, P.L.C.

(57) ABSTRACT

A stage apparatus includes a control circuit board, a stationary support member facing the control circuit board, a stage member superposing the stationary support member and provided on the opposite side of the stationary support member to the control circuit board, the stage member being movable relative to the stationary support member in a plane; an electronic component fixed to the stage member; a flexible conductive member, one end thereof connected to the electronic component and the other end thereof connected to the control circuit board; and a driver generating a driving force for moving the stage plate. The stationary support member includes a conductive member escape recess, recessed from a peripheral edge toward a central portion thereof and extending through the stationary support member in the thickness direction. Part of the flexible conductive member is inside the conductive member escape recess.

15 Claims, 4 Drawing Sheets

(56) References Cited

U.S. PATENT DOCUMENTS

| | | | |
|---|---|---|---|
| 2008/0225126 A1* | 9/2008 | Mogamiya | H04N 5/23248 348/208.4 |
| 2011/0069430 A1* | 3/2011 | Huang | H01R 12/78 361/679.01 |
| 2013/0194442 A1 | 8/2013 | Yazawa | |

FOREIGN PATENT DOCUMENTS

| | | |
|---|---|---|
| JP | 2013-160805 | 8/2013 |
| JP | 2013-160806 | 8/2013 |

* cited by examiner

STAGE APPARATUS, IMAGE-SHAKE CORRECTION APPARATUS AND ELECTRONIC APPARATUS

BACKGROUND OF THE INVENTION

1. Field of the Invention

The present invention relates to a stage apparatus, an image-shake correction apparatus and an electronic apparatus.

2. Description of the Related Art

A camera shake correction apparatus (image shake correction apparatus/image stabilizer) which is provided with a rear yoke (stationary support plate/stationary support member) fixed onto an inner side of a camera body, a front yoke provided in front of the rear yoke, a stage plate provided between the rear yoke and the front yoke while being relatively moveable thereto in a plane parallel thereto, a plurality of permanent magnets fixed onto a rear side of the front yoke, and a control board, is an example of a camera shake correction apparatus of the related art which utilizes an image sensor (image pickup device). The image sensor and a plurality of coils are fixed to the front surface of the stage plate. The permanent magnets, the front yoke and the rear yoke form magnetic fields, and the respective coils stay within these magnetic fields regardless of the position of the stage plate. Terminals which project rearwardly from the rear surface of the image sensor are positioned on the rear side of the stage plate. One end of a flexible printed circuit (FPC) board is fixed to the rear surface of the stage plate, and the other end of the FPC board is electrically connected to a control circuit board (controller).

According to the above-described example of the related art, when the camera is shaken (for example, when an operator's hand unintentionally shakes) the controller passes an electric current through the coils. Consequently, each coil produces a driving force, whereby the stage plate and the image sensor slidably move. Thus the image shake of the camera is corrected.

A second example of the related art is disclosed in Japanese unexamined patent publication No. 2013-160806.

In the related art, a type of camera shake correction apparatus is known in which a control circuit board is provided immediately behind the rear yoke, and a type of camera shake correction apparatus (Japanese unexamined patent publication No. 2013-160806) is known in which a control circuit board is arranged on a plane on which the rear yoke lies.

In a camera provided with the former above-mentioned type of camera shake correction apparatus, since part of one end of a flexible printed circuit board is connected to the rear side (terminals) of the image sensor, the rear yoke, the (part of one end of the) flexible printed circuit board and the control circuit board are arranged in the forward/rearward direction of (thickness direction) the camera body. Accordingly, since the space (distance) between the rear yoke and the control circuit board increases in the forward/rearward direction, the camera shake correction apparatus and the camera body become enlarged in the forward/rearward direction (optical axis direction).

Whereas, in the latter above-mentioned type of camera shake correction apparatus (Japanese unexamined patent publication No. 2013-160806), a control circuit board is arranged on a plane on which the rear yoke lies (beside the rear yoke), and an FPC board escape recess is also formed in an end edge of the rear yoke at the control circuit board side; the FPC escape recess is recessed toward a central part of the rear yoke and also extends through the rear yoke in a thickness direction thereof (forward/rearward direction). Furthermore, part of the flexible printed circuit board, which extends sideways (toward the control circuit board) from the rear surface (terminals) of the image sensor is positioned in the FPC board escape recess. Accordingly, in the latter above-mentioned type of camera shake correction apparatus and camera body, the distance in the forward/rearward direction between the rear yoke and the control circuit board can be shortened compared with the former above-mentioned type of camera shake correction apparatus and camera body.

However, the latter above-mentioned type of camera shake correction apparatus is configured so that the control circuit board and the rear yoke lie on a common plane, and if the camera body is a miniaturized type, the control circuit board must also be miniaturized, so that a large control circuit board cannot be utilized. For example, in a mirrorless camera, since the electronic components mounted onto the control circuit board are typically few in number, it is possible to use a small-sized control circuit board. However, in a single-lens reflex camera (SLR camera), since a large number of electronic components are mounted onto the control circuit board, a large control circuit board must be used. Therefore, it is difficult to employ the structure of the latter above-mentioned type of camera shake correction apparatus (Japanese unexamined patent publication No. 2013-160806) in a control circuit board in which a large number of electronic components are mounted onto the control circuit board, like that in the case of an SLR camera (and also including cameras other than SLR cameras).

SUMMARY OF THE INVENTION

The present invention provides a stage apparatus, an image-shake correction apparatus and an electronic apparatus in which the dimensions, in the thickness direction of the control circuit board, between a stationary support member and the control circuit board can be made small, even in the case where the stationary support member (which supports a stage member) and a large-sized control circuit board are arranged in the thickness direction of the control circuit board.

According to an aspect of the present invention, a stage apparatus is provided, including a control circuit board; a stationary support member which faces the control circuit board in a thickness direction of the control circuit board; a stage member which superposes the stationary support member in the thickness direction and is provided on the opposite side of the stationary support member to the control circuit board, wherein the stage member is slidably movable relative to the stationary support member in a plane; an electronic component fixed to the stage member; a flexible conductive member, wherein one end of the flexible conductive member is connected to the electronic component, on a side thereof that faces the stationary support member, and wherein the other end of the flexible conductive member is connected to the control circuit board; and a driver which generates a driving force for slidably moving the stage plate. The stationary support member includes a conductive member escape recess, which is recessed from a peripheral edge of the stationary support member and toward a central portion thereof, the conductive member escape recess extends through the stationary support member in the thickness direction. A part of the flexible conductive member is positioned inside the conductive member escape recess.

It is desirable for the part of the flexible conductive member to include a parallel extension which extends parallel to the control circuit board.

It is desirable for the flexible conductive member to be a flexible printed board.

It is desirable for the driver to include a permanent magnet fixedly mounted onto one of a first member and a second member which is made of a magnetic material; and a drive coil fixedly mounted onto the other of the first member and the second member, wherein the drive coil is positioned within a magnetic field that is generated by the permanent magnet, and wherein the drive coil generates a driving force when an electrical current is supplied thereto. The first member includes one of the stationary support member and a stationary member that is fixedly mounted on the stationary support member, and the second member includes the stage member.

It is desirable for the stationary support member to include a first yoke made of a magnetic material, wherein the stationary member includes a second yoke made of a magnetic material, the second yoke being provided on an opposite side of the stage member from the first yoke. The permanent magnet is fixed onto the second yoke, and the coil is fixed onto the stage member.

It is desirable for at least a part of the control circuit board to be positioned at the outer periphery of the stationary support member when viewed in the thickness direction of the control circuit board.

In an embodiment, an image-shake correction apparatus including the above-described stage apparatus is provided, wherein the electronic component includes an image sensor provided at the opposite side of the stage member from the stationary support member.

It is desirable for the image-shake correction apparatus to include a body case, in which the stage apparatus is provided.

It is desirable for the body case to include a grip at one of left and right sides of the body case, wherein one of left and right side edges of the stationary support member that corresponds to the other of the left and right sides of the body case is recessed toward a central portion of the stationary support member to form the conductive member escape recess.

It is desirable for a battery accommodation space to be provided inside the grip of the body case.

In an embodiment, an electronic apparatus is provided, including a control circuit board; a stationary support member which faces the control circuit board in a thickness direction of the control circuit board; a stage member which superposes the stationary support member in the thickness direction and is provided on the opposite side of the stationary support member to the control circuit board, wherein the stage member is slidably movable relative to the stationary support member in a plane; an electronic component fixed to the stage member; a flexible conductive member, wherein one end of the flexible conductive member is connected to the electronic component, on a side thereof that faces the stationary support member, and wherein the other end of the flexible conductive member is connected to the control circuit board; and a driver which generates a driving force for slidably moving the stage plate. The stationary support member includes a conductive member escape recess, which is recessed from a peripheral edge of the stationary support member and toward a central portion thereof, the conductive member escape recess extending through the stationary support member in the thickness direction. A part of the flexible conductive member is positioned inside the conductive member escape recess.

According to the stage apparatus and image-shake correction apparatus of the present invention, the dimensions in the thickness direction of the control circuit board between a stationary support member and the control circuit board can be made small, even in the case where the stationary support member (which supports a stage member) and a large-sized control circuit board are arranged in the thickness direction of the control circuit board.

The present disclosure relates to subject matter contained in Japanese Patent Application No. 2014-183150 (filed on Sep. 9, 2014) which is expressly incorporated herein by reference in its entirety.

BRIEF DESCRIPTION OF THE DRAWINGS

The present invention will be described below in detail with reference to the accompanying drawings in which.

DESCRIPTION OF THE PREFERRED EMBODIMENTS

An embodiment of the present invention will be discussed in detail hereinafter with reference to FIGS. 1 through 7. In the following description, the horizontal direction, the vertical direction and the forward/rearward direction of a camera (SLR camera/electronic apparatus) 10 are referred to as an X-direction, a Y-direction and a Z-direction, respectively.

Firstly, the basic structures of the camera 10 and the camera shake correction apparatus 20 will be discussed hereinbelow.

Figure 1:
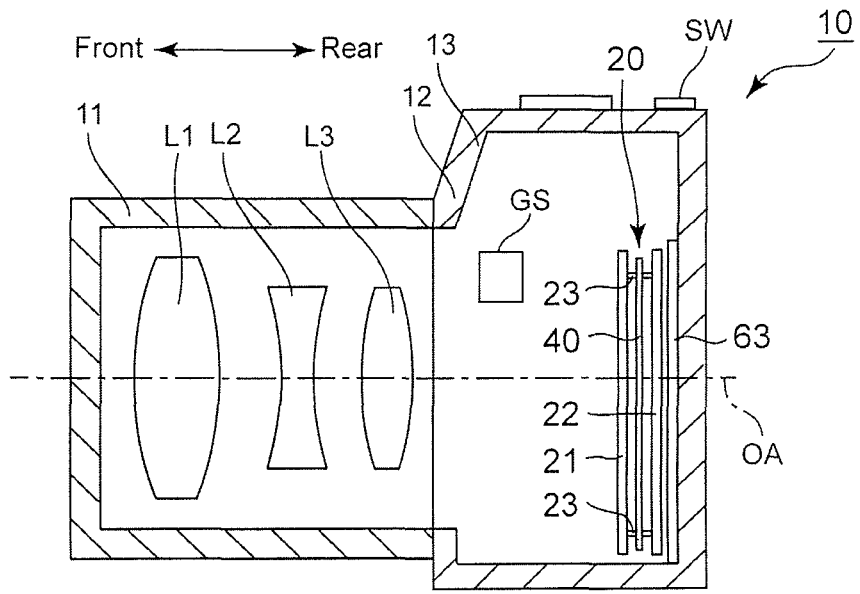
FIG. 1 is a longitudinal sectional view of an SLR camera according to an embodiment of the present invention.

As shown in FIG. 1, a lens barrel 11 of the camera 10 is provided therein with a photographing optical system including a plurality of lens groups L1, L2 and L3.

Figure 7:
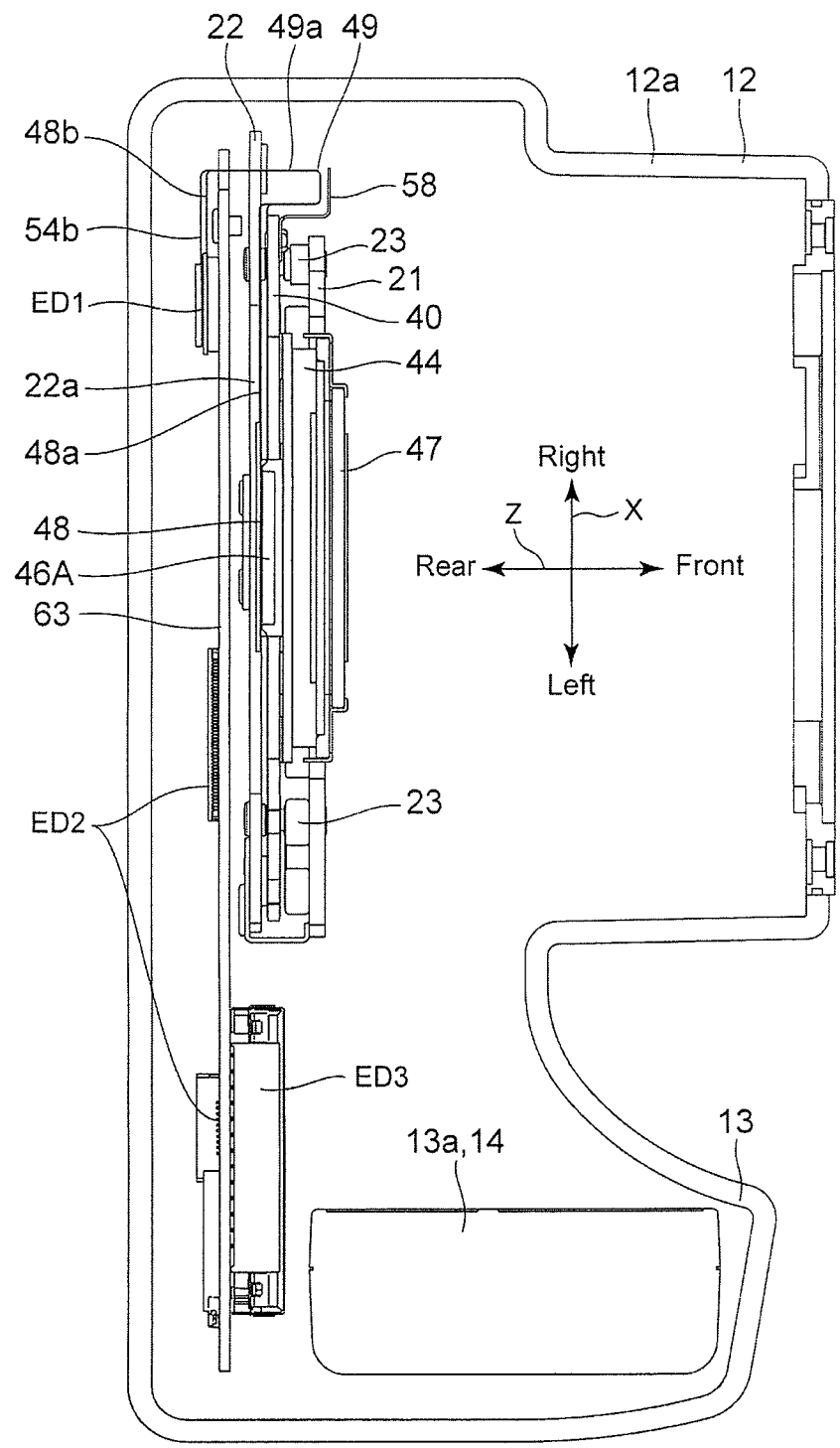
FIG. 7 is a cross sectional view taken along the arrows VII-VII shown in FIG. 4.

A left side section of a body case 12a of a camera body 12, to which the lens barrel 11 can be detachably attached, is formed as grip 13, in which a front part thereof forwardly bulges out more than a part positioned at the right side thereof (see FIG. 7). A battery accommodation space 13a, a central axis of which extends in the upward/downward direction, is formed inside the grip 13. A battery 14 is accommodated inside the battery accommodation space 13a. Furthermore, a shutter mechanism positioned behind the lens group L3, a quick-return mirror positioned in front of the shutter mechanism, and a finder prism, etc., positioned above the quick-return mirror (which are all omitted from the drawings) are provided inside the camera body 12. A display (LCD)(not shown) is also provided in the back face of the body case 12a. Furthermore, the camera shake correction apparatus (stage apparatus) 20, which is positioned directly behind the shutter mechanism, is provided inside the camera body 12.

As shown in FIGS. 2 through 7, the camera shake correction apparatus 20 is provided with a front yoke (stationary member/second yoke) 21 and a rear yoke (stationary support plate/stationary support member/first yoke) 22, respectively, each having a flat-plate shape. The front yoke 21 is in the shape of a horizontally-elongated rectangle with a punched-out rectangular hole 28 at the center thereof, as viewed from the front, and is made of a magnetic material such as a soft metal. The rear yoke 22 is in the shape of horizontal U-shape, as viewed from the front, and is made of a magnetic material such as a soft metal.

Figure 2:
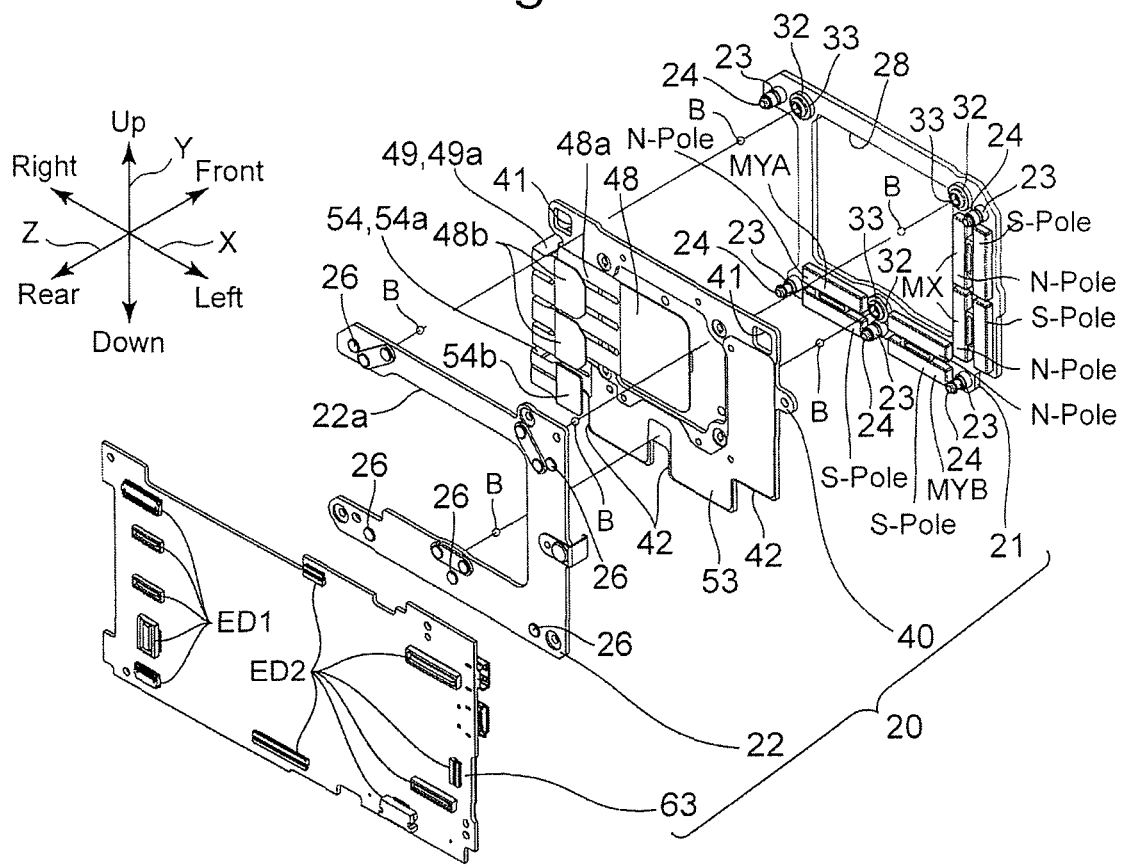
FIG. 2 is an exploded perspective view of the camera shake correction apparatus, viewed obliquely from the rear thereof.
Figure 3:
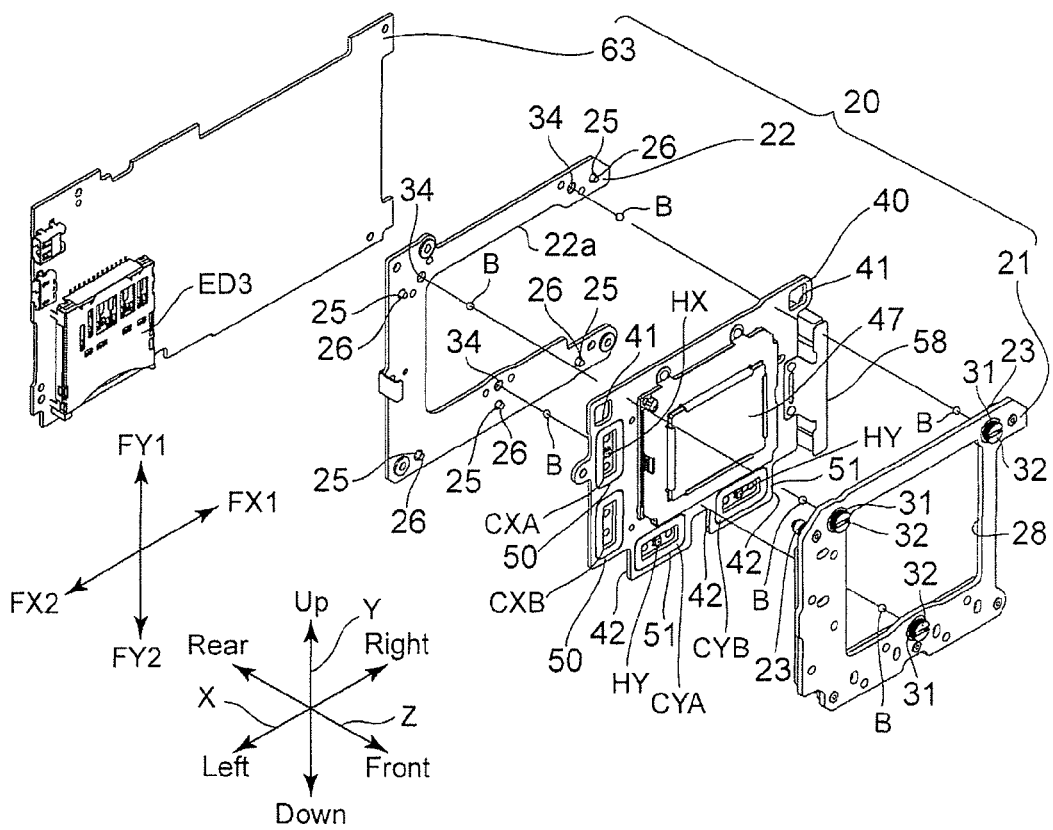
FIG. 3 is an exploded perspective view of the camera shake correction apparatus, viewed obliquely from the front thereof.
Figure 6:
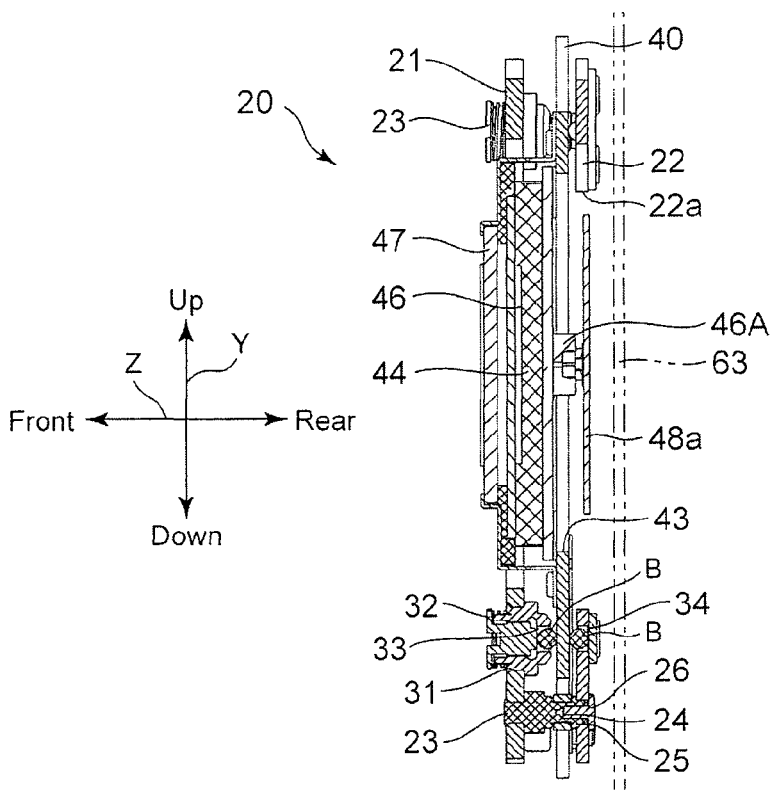
FIG. 6 is a cross sectional view taken along the arrows VI-VI shown in FIG. 4.

The front yoke 21 is provided, at five different positions on the rear surface thereof, with five connecting supports 23 which project rearwardly, and each of the five connecting supports 23 is provided at the rear end surface thereof with a female screw hole 24. An FPC board escape recess (conductive member escape recess) 22a is formed through the rear yoke 22 in the plate thickness direction (Z-direction) thereof and defines a recess that extends leftward from the right edge (towards a central portion) of the rear yoke 22. The rear yoke 22 is provided, at five different positions thereon which correspond to the positions of the five connecting supports 23, respectively, with five through-holes 25. As shown in FIGS. 2, 3 and 6, five set screws 26 are inserted into the five through-holes 25 from behind, and the five set screws 26 are screwed into the female screw holes 24 of the five connecting supports 23, respectively. Due to the screw engagement of the five set screws 26 with the five connecting supports 23, the front yoke 21 and the rear yoke 22 are fixedly connected so as to be parallel to each other. The rear yoke 22 is fixed to an internal surface of the camera body 12 by three set screws (not shown).

The front yoke 21 is provided with three fitting holes 31, each of which is circular in shape as viewed from the front thereof. As illustrated in FIG. 3, the two fitting holes 31 extend through the portions in the vicinity of the upper left corner and the upper right corner of the front yoke 21, respectively, while the other fitting hole 31 extends through the lower center portion of the front yoke 21. A retainer 32 is fixedly fitted into each fitting hole 31 from the rear side thereof. Each retainer 32 is provided, on the rear end surface thereof, with a circular-shaped ball support recess 33. The rear yoke 22 is provided, on the front surface thereof, with three ball support recesses 34 that have substantially the same circular shape as that of the fitting holes 31. The two ball support recesses 34 are formed in the vicinity of the upper left corner and at the upper right corner of the rear yoke 22, while the other ball support recess 34 is formed at the lower center portion of the rear yoke 22.

The camera shake correction apparatus 20 is provided, on the rear surface of the front yoke 21 and on the left side of the rectangular hole 28 (i.e., the portion of the front yoke 21 that faces, in the rearward direction, the portion of the rear yoke 22 on the opposite side of the open end of the FPC board escape recess 22a in the X-axis direction), with one pair of left and right X-direction magnets (permanent magnets) MX positioned at the upper part of the front yoke 21, and another pair of left and right X-direction magnets MX positioned at the lower part of the front yoke 21. Each of the two pairs of X-direction magnets MX has the same specifications, in which the rear half and the front half of the right magnet serve as an N-pole and an S-pole, respectively, and the rear half and the front half of the left magnet serve as an S-pole and an N-pole, respectively. The upper and lower pairs of X-direction magnets MX are aligned in the Y-axis direction and the positions of the upper and lower pairs of X-direction magnets MX in the X-axis direction are the same. The magnetic forces generated by the pairs of X-direction magnets MX and reaching the front yoke 21 and the rear yoke 22 (i.e., the passages of magnetic fluxes of the upper and lower pairs of X-direction magnets MX through the front yoke 21 and the rear yoke 22) form two X-direction magnetic circuits between the upper pair of X-direction magnets MX and the corresponding portion of the rear yoke 22 which face the upper pair of X-direction magnets MX in the Z-direction, and between the lower pair of X-direction magnets MX and the corresponding portion of the rear yoke 22 which face the lower pair of X-direction magnets MX in the Z-direction. These two X-direction magnetic circuits have the same magnetic flux density.

The camera shake correction apparatus 20 is further provided, on the rear surface of the front yoke 21 below the rectangular hole 28, with two (right and left) pairs of Y-direction magnets (permanent magnets) MYA and MYB, which are arranged side by side in a straight line. The left and right pairs of Y-direction magnets MYA and MYB are aligned in the X-axis direction, and the positions of the left and right pairs of Y-direction magnets MYA and MYB in the Y-axis direction are the same. Each of the two pairs of Y-direction magnets MYA and MYB has the same specifications, in which the rear half and the front half of the upper magnet serve as an N-pole and an S-pole, respectively, and the rear half and the front half of the lower magnet serve as an S-pole and an N-pole, respectively. The magnetic forces generated by the pairs of Y-direction magnets MYA and MYB, and reaching the front yoke 21 and the rear yoke 22 (i.e., the passages of magnetic fluxes of the left and right pairs of Y-direction magnets MYA and MYB through the front yoke 21 and the rear yoke 22) form two Y-direction magnetic circuits between the Y-direction magnet MYA and the corresponding portion of the rear yoke 22 which face the Y-direction magnet MYA in the Z-direction, and between the Y-direction magnet MYB and the corresponding portion of the rear yoke 22 which face the Y-direction magnet MYB in the Z-direction. These two Y-direction magnetic circuits have the same magnetic flux density.

The camera shake correction apparatus 20 is provided between the front yoke 21 and the rear yoke 22 with a flat metal stage plate (stage member) 40 which is arranged between the front yoke 21 and the rear yoke 22 in the Z-direction. The stage plate 40 is provided at the upper right corner and at the upper left corner thereof with two square moving range limit holes 41, respectively. Additionally, the stage plate 40 is further provided, at the lower end thereof, with three escape recesses 42. Two of the five connecting supports 23 which project from the front yoke 21 in the vicinity of the right and left upper corners thereof pass through the two moving range limit holes 41 of the stage plate 40 in the Z-direction, respectively, while the remaining three of the five connecting supports 23 which project from the lower end of the front yoke 21 pass through the escape recess 42 of the stage plate 40 in the Z-direction.

Three rotatable balls B are respectively accommodated (inserted) in the corresponding three ball support recesses 33 of the retainers 32. These three balls B are positioned in front of the stage plate 40 in the Z-direction. Three other rotatable balls B are respectively accommodated (inserted) in the corresponding three ball support recesses 34 that are formed on the front surface of the rear yoke 22. These other three balls B are positioned at the rear of the stage plate 40 in the Z-direction. The diameter of each of the balls B is substantially the same as, or slightly smaller than, the distance between the bottom surface of the ball support recess 33 of the retainer 32 and the front opposing surface of the stage plate 40 in the Z-axis direction, and also the distance between the bottom surface of the ball support recess 34 of the rear yoke 22 and the rear opposing surface of the stage plate 40 in the Z-axis direction. Thus each of the three balls B can come in rollable contact with the corresponding bottom surface of the ball support recess 33 of the retainer 32 and with the front surface of the stage plate 40, while each of the other three balls B can come in rollable contact with the corresponding bottom surface of the ball support recess 34 of the rear yoke 22 and with the rear surface of the stage plate 40.

Thus, three of the six balls B are in rollable contact with the three ball support recesses 33 of the retainer 32, and the other three of the six balls B are in rollable contact with the three ball support recesses 34 of the rear yoke 40, and at the same time, the six balls B are all in rollable contact with the stage plate 40. Accordingly, the stage plate 40 can linearly move, relative to the front yoke 21 and the rear yoke 22, in the X-direction and the Y-direction from the initial position shown in FIGS. 4 and 5. Furthermore, the stage plate 40 can also rotatably move in a plane parallel to the X-Y axis plane that is orthogonal to an optical axis OA.

Since two of the five connecting supports 23 projecting rearward from the front yoke 21 extend through the moving range limit holes 41 of the stage plate 40, the slide-movement range of the stage plate 40 is limited by a predetermined range determined by the moving range limit holes 41 and the connecting support 23.

Figure 4:
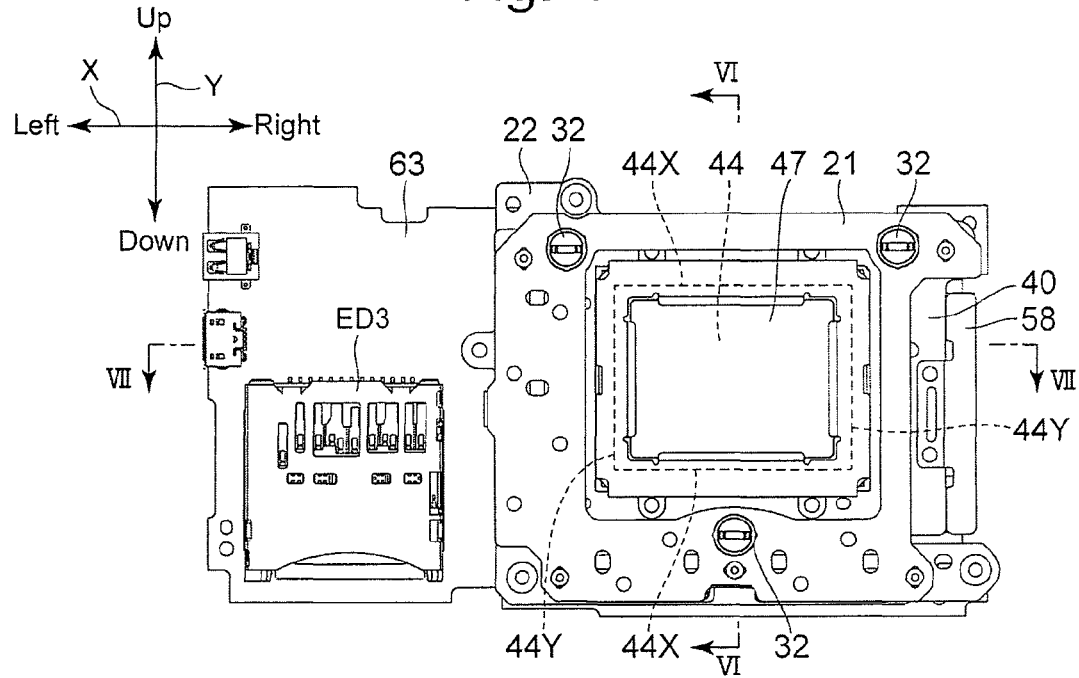
FIG. 4 is a front elevational view of the camera shake correction apparatus.

As shown in FIG. 6, a rectangular center hole 43 is formed through the center portion of the stage plate 40. The stage plate 40 is provided with an image sensor (electrical component) 44 fixed to the front side thereof and facing the center hole 43. The image sensor 44 has a substantially rectangular shape as viewed from the front thereof, as shown in FIG. 4, and an imaging surface 46 is provided on the front surface thereof. A large number of terminals which extend rearwardly from the back surface of the image sensor 44 are soldered to an image sensor circuit board 46A, which is arranged immediately behind the image sensor 44. The image sensor 44 is provided with a pair of X-direction edges (upper and lower X-direction edges) 44X which extend parallel to the X-direction, and a pair of Y-direction edges (right and left Y-direction edges) 44Y which extend parallel to the Y-direction, when the stage plate 40 is in the initial position shown in FIGS. 4 and 5. A rectangular cover glass 47 is fixed to the image sensor 44 immediately in front of the imaging surface 46. The imaging surface 46 of the image sensor 44 is an image-forming surface on which object-emanating light, which is passed through the lens groups L1, L2 and L3 and through the cover glass 47, is formed as an object image. When the stage plate 40 is in the initial position (when the stage plate 40 is in the state shown in FIGS. 4 and 5), the center of the imaging surface 46 of the image sensor 44 is positioned on the optical axis OA (photographing optical path) of the lens groups L1, L2 and L3.

Parallel extensions 48a, which extend in the leftward/rightward direction and constitute part of an image sensor FPC board (communication circuit board/flexible conductive member) 48 is provided immediately behind the stage plate 40. The front surfaces of the left portions of the parallel extensions 48a are connected to a connector that is provided on a rear surface of the image sensor circuit board 46A. Furthermore, the portions of the image sensor FPC board 48 that are connected with the right portions of the parallel extensions 48a constitute deformed portions 49, each of which is deformed (bent) in a U-shape as viewed from the top of the camera body 12. Board connectors 48b, which are provided on the opposite end of the image sensor FPC board 48 from the image sensor 44, extend leftward (in a direction parallel to a control board 63, which will be discussed later) from rear edges of right sections 49a of the deformed portions 49 and are positioned a step rearward from the parallel extensions 48a. Furthermore, as illustrated in FIGS. 6 and 7, the parallel extensions 48a of the image sensor FPC board 48 are accommodated in the FPC board escape recess 22a (i.e., in the same plane as that of the rear yoke 22).

As shown in FIG. 3, the stage plate 40 is provided with a pair of (upper and lower) coil mounting holes 50, having the same (vertically-long rectangular) shape, on the left side of the image sensor 44 and are aligned in a direction parallel to the Y-direction edges 44Y (in the Y-direction in FIG. 3). The stage plate 40 is also provided with a pair of (left and right) coil mounting holes 51, having the same (horizontally-long rectangular) shape, on the lower side of the image sensor 44 and are aligned in the a direction parallel to the X-direction edges 44X (in the X-direction in FIG. 3).

The upper and lower coil mounting holes 50, aligned in the Y-axis direction of the stage plate 40, fixedly accommodate an X-direction drive coil CXA and an X-direction drive coil CXB, respectively. The upper and lower X-direction drive coils CXA and CXB have the same specifications (have the same number of coil windings), are parallel to the X-Y axis plane, and have over one hundred coil windings (both in the direction parallel to the stage plate 40 and in the direction of thickness of the stage plate 40). The two X-direction drive coils CXA and CXB are positioned to always correspond to the aforementioned two X-direction magnetic circuits (the magnetic fields), respectively, regardless of the position of the stage plate 40. In other words, the two X-direction drive coils CXA and CXB are positioned to face the upper and lower pairs of X-direction magnets MX, respectively, in the Z-direction. When an electric current in one direction is supplied to both the X-direction drive coils CXA and CXB, each of the X-direction drive coils CXA and CXB produces a linear drive force in a direction FX1 (that is a direction parallel to the X-direction edges 44X), as shown in FIG. 3. When an electric current in the other (opposite) direction is supplied to both the X-direction drive coils CXA and CXB, each of the X-direction drive coils CXA and CXB produces a linear drive force in a direction FX2 (that is also a direction parallel to the X-direction edges 44X), shown in FIG. 3. Hence, the X-direction drive coils CXA and CXB and the X-direction magnets MX constitute a driver for driving the stage plate 40 in the X-direction.

The left and right coil mounting holes 51 fixedly accommodate a Y-direction drive coil CYA and a Y-direction drive coil CYB, respectively. The left and right Y-direction drive coils CYA and CYB have the same specifications (have the same number of coil windings), are parallel to the X-Y axis plane, and have over one hundred coil windings (both in the direction parallel to the stage plate 40 and in the direction of thickness of the stage plate 40). The two Y-direction drive coils CYA and CYB are positioned to always correspond to the aforementioned two Y-direction magnetic circuits (the magnetic fields), respectively, regardless of the position of the stage plate 40. In other words, the two Y-direction drive coils CYA and CYB are positioned to face the left and right Y-direction magnets MYA and MYB, respectively, in the Z-direction. When an electric current in one direction is supplied to both the Y-direction drive coils CYA and CYB, each of the Y-direction drive coils CYA and CYB produces a linear drive force in the direction FY1 (that is a direction parallel to the Y-direction edges 44Y), as shown in FIG. 3. When an electric current in the other (opposite) direction is supplied to both the Y-direction drive coils CYA and CYB, each of the Y-direction drive coils CYA and CYB produces a linear drive force in the direction of FY2 (that is also the direction parallel to the Y-direction edges 44Y), shown in FIG. 3. Hence, the Y-direction drive coils CYA and CYB and the Y-direction magnets MYA and MYB constitute a driver for driving the stage plate 40 in the Y-direction.

A coil energization FPC board (communication circuit board) 53 is provided, in which the left half portion thereof is fixed to the rear surface of the stage plate 40. The left half portion of the coil energization FPC board 53 is L-shaped as viewed from the rear thereof, with which the each terminal of the X-direction drive coils CXA and CXB, and the Y-direction drive coils CYA and CYB are electrically connected, respectively. The coil energization FPC board 53 is provided with deformed portions 54, each of which is bent in a U-shape as viewed from the top of the camera body 12, in the portion of the coil energization FPC board 53 that is positioned slightly to the right of the stage plate 40. Left sections 54b, which are provided at an end section of the coil energization FPC board 53 opposite to the stage plate 40, are positioned one step rearward compared to the left half portion of the coil energization FPC board 53 and extend toward the left side from the rear edge of right sections 54a of the deformed portions 54.

Furthermore, the coil energization FPC board 53 is provided with an X-direction Hall element HX and a pair of Y-direction Hall elements HY, respectively fixed by soldering onto the front surface of the coil energization FPC board 53. The X-direction Hall element HX is positioned inside the upper X-direction drive coil CXA. The pair of Y-direction Hall elements HY are positioned inside the left and right of Y-direction drive coils CYA and CYB, respectively.

As shown in FIGS. 3 and 7, a left end of an FPC board cover member 58, which has a substantially crank-shaped cross sectional view, is fixed to the right edge of the front surface of the stage plate 40. The FPC board cover member 58 has been prepared by bending a thin metal plate, and the right section of the FPC board cover member 58 protects the front edge portions of the deformed portions 49 and 54 (see FIG. 7).

Figure 5:
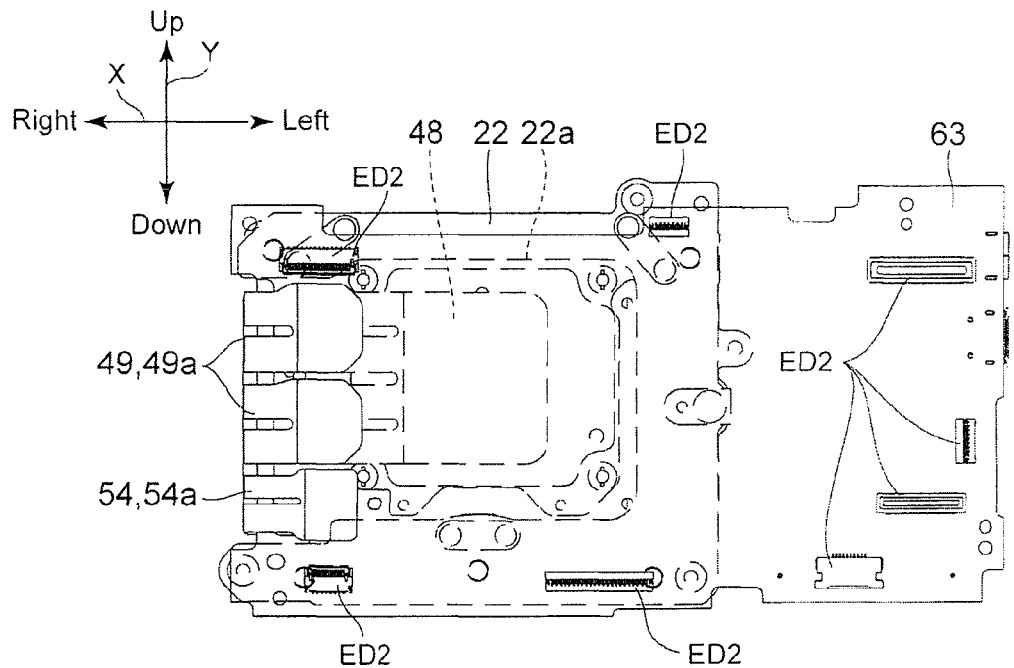
FIG. 5 is a rear elevational view of the camera shake correction apparatus.

As shown in FIGS. 2 through 7, the camera shake correction apparatus 20 is provided with a control circuit board 63, which is made of a rigid material, is positioned immediately behind the rear yoke 22, is parallel to the stage plate 40, and is electrically conductive with the battery 14. The rear yoke 22 and the control circuit board 63 superpose each other in the Z-direction (board thickness direction of the control circuit board 63). As shown in the drawings, the dimensions of the control circuit board 63 in the leftward/rightward direction are larger than those of the front yoke 21, the rear yoke 22, and the stage plate 40. Accordingly, as shown in FIGS. 4 and 5, part of the control circuit board 63 is positioned on the outer periphery of the rear yoke 22 (and the front yoke 21 and the stage plate 40) when viewed in the Z-direction. The control circuit board 63 is fixed to the inner surface of the camera body 12 by fixing screws (not shown).

As shown in FIGS. 2 and 5, a plurality of electronic components ED1 and ED2 are mounted on the rear surface of the control circuit board 63. As shown in FIG. 3, a plurality of electronic components ED3 are also mounted on the front surface of the control circuit board 63 (although only one electronic component ED3 is shown at the left end of the control circuit board 63 in FIG. 3, a number of electronic components ED1, ED2 and ED3 are actually mounted on the control circuit board 63 over a large area on the front and rear sides thereof). Furthermore, the terminals of the image sensor FPC board 48 and the coil energization FPC board 53 at the opposite ends to those at the stage plate 40 are soldered onto the rear side of the terminals of the plurality of electronic components ED1.

Furthermore, a gyro sensor GS (see FIG. 1), which is provided inside the camera body 12, is each connected to the control circuit 63.

The components to which the numerators 20 through 63 have been designated, the X-direction drive coils CXA and CXB, the Y-direction drive coils CYA and CYB, the X-direction Hall element HX, the pair of Y-direction Hall elements HY, the pairs of X-direction magnets (permanent magnets) MX, and the pairs of Y-direction magnets MYA and MYB are the components of the camera shake correction apparatus 20.

The camera shake correction apparatus 20 carries out a camera shake correction (image shake compensation) by supplying electric current from the control circuit board 63 to the X-direction drive coils CXA and CXB and the Y-direction drive coils CYA and CYB via the coil energization FPC board 53.

More specifically, if the camera 10 shakes in the X-direction while a camera shake correction switch SW (see FIG. 1) provided on the camera body 12 is depressed, the gyro sensor GS incorporated in the camera 10 detects the angular velocity of the camera body 12. Thereupon, based on data on the angular velocity, the control circuit board 63 calculates the moving distance (amount of camera shake) in the X-direction and supplies electrical current in one direction to both of the X-direction drive coils CXA and CXB, which are positioned within the X-direction magnetic circuits (magnetic fields). Thereupon, the X-direction drive coils CXA and CXB generate a drive force (Lorentz force) in the direction of arrow FX1. Conversely, when the control circuit board 63 supplies electrical current in the other (opposite) direction to both the X-direction drive coils CXA and CXB, the X-direction drive coils CXA and CXB generate a drive force (Lorentz force) in the direction of arrow FX2. Accordingly, an image shake amount of the image sensor 44 occurring in the X-direction can be corrected by the X-direction Hall element HX detecting the sliding amount (distance) of the stage plate 40 in the X-direction and by linearly moving the image sensor 44 (stage plate 40) relative to the camera body 12 in the opposite direction to the image-shake direction by a distance equaling the same amount as the image shake amount in either the direction of arrow FX1 or FX2, while the deformed portions 49 of the image sensor FPC board 48 and the deformed portions 54 of the coil energization FPC board 53 flex (deform).

Whereas, if the camera 10 shakes in the Y-direction while the camera shake correction switch SW is depressed, the gyro sensor GS detects the angular velocity of the camera body 12. Thereupon, based on data on the angular velocity, the control circuit board 63 calculates the moving distance (amount of camera shake) in the Y-direction and supplies electrical current in one direction to both of the Y-direction drive coils CYA and CYB, which are positioned within the Y-direction magnetic circuits (magnetic fields). Thereupon, the Y-direction drive coils CYA and CYB generate a drive force (Lorentz force) in the direction of arrow FY1. Conversely, when the control circuit board 63 supplies electrical current in the other (opposite) direction to both the Y-direction drive coils CYA and CYB, the Y-direction drive coils CYA and CYB generate a drive force (Lorentz force) in the direction of arrow FY2. Accordingly, an image shake amount of the image sensor 44 occurring in the Y-direction can be corrected by the Y-direction Hall element HY detecting the sliding amount (distance) of the stage plate 40 in the Y-direction and by linearly moving the image sensor 44 (stage plate 40) relative to the camera body 12 in the opposite direction to the image-shake direction by a distance equaling the same amount as the image shake amount in either the direction of arrow FY1 or FY2, while the deformed portions 49 of the image sensor FPC board 48 and the deformed portions 54 of the coil energization FPC board 53 flex (deform).

If shake of the camera 10 in the rotational direction occurs while the camera shake correction switch SW is depressed, the gyro sensor GS detects the angular velocities of the camera body 12. Thereupon, based on data on the angular velocities, the control circuit board 63 calculates the moving distance (amount of camera shake) in the X-direction and Y-direction, and passes electric current through both of the X-direction drive coils CXA and CXB, and the Y-direction drive coils CYA and CYB. The value of electric current passing through the X-direction drive coils CXA and CXB is the same, while the value of electric current passing through the left Y-direction drive coil CYA is different from the value of electric current passing through the right Y-direction drive coil CYB. Accordingly, since the left Y-direction drive coil CYA produces a driving force that is different from the driving force of the right Y-direction drive coil CYB, due to the resultant force of the force in the direction of arrow FX1 or arrow FX2 produced by the X-direction drive coils CXA and CXB and the force in the direction of arrow FY1 or arrow FY2 produced by the Y-direction drive coils CYA and CYB, the image sensor 44 (stage plate 40) rotatably moves in the direction opposite to the rotational image shake direction by the same amount of that of the camera shake, while the deformed portions 49 of the image sensor FPC board 48 and the deformed portions 54 of the coil energization FPC board 53 flex (deform), thereby correcting the image shake (image rotation) of the image sensor 44.

Upon compensation of image shake, when a shutter release button (not shown) of the camera body 12 is depressed, the control circuit board 63 transmits a imaging signal (electric signal) to the image sensor 44 via the image sensor FPC board 48, whereby the image sensor 44 carries out an imaging operation. The image sensor 44 transmits imaging data (electric signal) to the control circuit board 63 via the image sensor FPC board 48, and the corresponding object image appears on the aforementioned display, which is provided on the rear surface of the camera body 12.

In the above-described embodiment of the camera 10 according to the present invention, since the dimensions of the control circuit board 63 in the leftward/rightward direction are larger (than those of the front yoke 21, the rear yoke 22 and the stage plate 40), the control circuit board 63 cannot be positioned on the same plane as that of the rear yoke 22 (beside the rear yoke 22); hence, the control circuit board 63 is positioned immediately behind the rear yoke 22. However, the parallel extensions 48a (of the image sensor FPC board 48) which are connected to the image sensor circuit board 46A of the image sensor 44, which is fixed to the stage plate 40, are provided in the FPC board escape recess 22a of the rear yoke 22 (the parallel extensions 48a lie on substantially the same plane on which the rear yoke 22 lies). Accordingly, compared to a configuration of an SLR camera of the related art, in which part of a image sensor FPC board is arranged adjacent to (drawn out in front of or behind) the rear yoke with respect to the plate thickness direction (forward/rearward direction) it is possible to reduce the dimensions (by an amend corresponding to the distance between the image sensor FPC board and the rear yoke in the forward/rearward direction) in the forward/rearward direction (in the thickness direction of the control circuit board 63) between the rear yoke 22 and the control circuit board 63. Accordingly, the camera shake correction apparatus 20 and the camera body 12 can be miniaturized in the Z-direction (optical axis direction).

Furthermore, the parallel extensions 48a of the image sensor ETC board 48 is accommodated inside the FPC board escape recess 22a. Accordingly, even if the distance in the Z-direction between the front yoke 21 and the rear yoke 22 is reduced in order to slim down (reduce the size of) the camera body 12 in the Z-direction, the parallel extensions 48a of the image sensor FPC board 48 do not contact the rear yoke 22, so that wear and damage of the image sensor FPC board 48 can be prevented.

Furthermore, even in the case where the distance between the front yoke 21 and the rear yoke 22 in the Z-direction is reduced, it is possible to form the deformed portions 49 in the image sensor FPC board 48 so that a smooth sliding operation of the stage plate 40 can be achieved.

In addition, the FPC board escape recess 22a is formed in the rear yoke 22 with the right side of the rear yoke 22 open, and the image sensor FPC board 48 (parallel extensions 48a) pass through the FPC board escape recess 22a and extend toward the right side. Accordingly, the image sensor FTC board 48 does not interfere with the battery accommodation space 13a (battery 14) inside the grip 13, provided at the left side portion of the body case 12a of the camera body 12, or the electronic component ED3 that is mounted on the left end on the front surface of the control circuit board 63.

Although the present invention has been applied to the above-described embodiment of the camera shake correction apparatus, the present invention is not limited to the above embodiment; various modifications can be made.

For example, the pairs of X-direction magnets MX and the pairs of Y-direction magnets MY can be fixed to the rear yoke 22, instead of fixing to the front yoke 21.

Furthermore, the pairs of X-direction magnets MX and the pairs of Y-direction magnets MY can be provided on a stage plate (corresponding to the above-described stage plate 40) which is made of a magnetic material, and the X-direction drive coils CXA and CXB, and the Y-direction drive coils CYA and CYB can be provided on one of the front yoke 21 and the rear yoke 22. Furthermore, in the case where the X-direction drive coils CXA and CXB, and the Y-direction drive coils CYA and CYB are provided on the front yoke 21, it is possible to use the rear yoke 22 as a stationary support member that does not function as a 'yoke' (only to have the function of supporting the stage plate 40), since it would not be necessary for the rear yoke 22 to function as a 'yoke' in such a case.

The FPC board escape recess 22a of the rear yoke 22 (stationary support member) can have an opening formed at an alternative position other than the right side, as in the above-described embodiment, such as the left side, the upper side or the lower side (recessed from the left edge, the upper edge or the lower edge toward the central portion). For example, in the case where the grip 13 and the battery accommodation space 13a are provided on the right end of the camera body 12, which is an opposite configuration to that of the above-described embodiment, the left side of the FPC board escape recess 22a can be open, and the parallel extensions 48*a* which are positioned inside the FPC board escape recess 22*a* can be drawn out toward the left side of the rear yoke 22 (stationary support plate) from the left side of the FPC board escape recess 22*a*.

Furthermore, the rear yoke 22 can be formed in an alternative shape (e.g., a rounded U-shape) provided that such an alternative shape has three adjacent sides that are approximately orthogonal to each other.

Rotational control (of the stage plate 40) can be carried out using the X-direction drive coils CXA and CXB by supplying different amounts of electrical current to one of the X-direction drive coils CXA and CXB than the other of the X-direction drive coils CXA and CXB. Furthermore, three of more of the coils that are used for such rotational control (out of the X-direction drive coils and the Y-direction drive coils) can be provided.

A different kind of driver (e.g., a motor) for generating a driving force for the stage plate 40 in the X-direction and the Y-direction can be provided as an alternative to the X-direction drive coils CXA and CXB, the Y-direction drive coils CYA and CYB, the X-direction magnets MX, and the Y-direction magnets MYA and MYB. In such a case, by mounting a motor onto the "stationary support member", which corresponds to the rear yoke 22, it is possible to omit a member that corresponds to the front yoke 21.

It is possible to provide the battery accommodation space 13*a* within the grip 13 so that the central axis of the battery accommodation space 13*a* extends in a leftward/rightward direction.

Furthermore, although in the above-described embodiment the present invention is applied to the camera shake correction apparatus 20 in which the stage plate 40 can rotate, the present invention can also be applied to a known camera shake correction apparatus in which a stage plate (that corresponds to the stage plate 40) only moves linearly in the X-direction and the Y-direction. Furthermore, the camera shake correction apparatus 20 of the present invention can also be applied to an electronic apparatus other than an SLR camera (e.g., the present invention can be applied to a mirrorless camera in the case where the control circuit board is enlarged due to a large number of components (electronic components) being mounted onto the control circuit board). Furthermore, the present invention can be applied to a smart phone (smart device) or a video camera (such as a camcorder, or a video camera for broadcasting, film-making, or industrial use).

In addition, the present invention can be applied to a "stage apparatus", in which an electronic component other than the image sensor 44 is mounted onto the stage plate 40.

Furthermore, the electronic component (the image sensor 44, etc.) that is mounted onto the stage plate 40 and the control circuit board 63 can be connected via a flexible conductive member other than a flexible printed board (image sensor FPC board 48), for example, via lead wires or a flexible flat cable (FFC), etc.

Obvious changes may be made in the specific embodiments of the present invention described herein, such modifications being within the spirit and scope of the invention claimed. It is indicated that all matter contained herein is illustrative and does not limit the scope of the present invention.

What is claimed is:

1. A stage apparatus comprising:
a control circuit board extending within a plane;
a stationary support which faces said control circuit board in a thickness direction of said control circuit board, the thickness direction extending in a direction transverse to the plane of the control circuit board;
a stage which is superimposed on said stationary support in the thickness direction and is provided on an opposite side of said stationary support with respect to said control circuit board, wherein said stage is slidably movable relative to said stationary support in a plane;
an electronic component fixed to said stage;
a flexible conductor, one end of said flexible conductor is connected to said electronic component, on a side of the electronic component that faces said stationary support, and the other end of said flexible conductor is connected to said control circuit board; and
a driver which generates a driving force for slidably moving said stage,
wherein said stationary support includes a conductor escape recess, which is recessed from a peripheral edge of said stationary support and extends toward a central portion of the stationary support, said conductor escape recess extending through said stationary support in the thickness direction, and
wherein a part of said flexible conductor is positioned inside said conductor escape recess.

2. The stage apparatus according to claim 1, wherein said part of said flexible conductor comprises a parallel extension which extends parallel to said control circuit board.

3. The stage apparatus according to claim 1, wherein said flexible conductor comprises a flexible printed board.

4. The stage apparatus according to claim 1, wherein said driver comprises:
a permanent magnet fixedly mounted onto one of a first member and a second member and which is of a magnetic material; and
a drive coil fixedly mounted onto the other of said first member and said second member, wherein said drive coil is positioned within a magnetic field that is generated by said permanent magnet, and wherein said drive coil generates a driving force when an electrical current is supplied to the drive coil,
wherein said first member includes one of said stationary support and a stationary member that is fixedly mounted on said stationary support, and said second member includes said stage.

5. The stage apparatus according to claim 4, wherein said stationary support includes a first yoke of a magnetic material,
wherein said stationary member includes a second yoke of a magnetic material, said second yoke being provided on an opposite side of said stage from said first yoke,
wherein said permanent magnet is fixed onto said second yoke, and
wherein said coil is fixed onto said stage.

6. The stage apparatus according to claim 1, wherein at least a part of said control circuit board is positioned at the outer periphery of said stationary support when viewed in the thickness direction of said control circuit board.

7. An image-shake correction apparatus comprising said stage apparatus according to claim 1, wherein said electronic component includes an image sensor provided at the opposite side of said stage from said stationary support.

8. The image-shake correction apparatus according to claim 7, further comprising a body case, in which said stage apparatus is provided.

9. The image-shake correction apparatus according to claim 8, wherein said body case comprises a grip at one of left and right sides of said body case, wherein one of left and right side edges of said stationary support that corresponds to the other of said left and right sides of said body case is recessed toward a central portion of said stationary support to form said conductor escape recess.

10. The image-shake correction apparatus according to claim 9, wherein a battery accommodation space is provided inside said grip of said body case.

11. An electronic apparatus comprising:
- a control circuit board extending within a plane;
- a stationary support which faces said control circuit board in a thickness direction of said control circuit board, the thickness direction extending in a direction transverse to the plane of the control circuit board;
- a stage which is superimposed on said stationary support in the thickness direction and is provided on an opposite side of said stationary support with respect to said control circuit board, wherein said stage is slidably movable relative to said stationary support in a plane;
- an electronic component fixed to said stage;
- a flexible conductor, one end of said flexible conductive member is connected to said electronic component, on a side of the electrical component that faces said stationary support, and the other end of said flexible conductor is connected to said control circuit board; and
- a driver which generates a driving force for slidably moving said stage,
- wherein said stationary support includes a conductor escape recess, which is recessed from a peripheral edge of said stationary support and extends toward a central portion of the stationary support, said conductor escape recess extending through said stationary support in the thickness direction, and
- wherein a part of said flexible conductor is positioned inside said conductor escape recess.

12. The electronic apparatus according to claim 11, wherein said part of said flexible conductor comprises a parallel extension which extends parallel to said control circuit board.

13. The electronic apparatus according to claim 11, wherein said flexible conductor comprises a flexible printed board.

14. The electronic apparatus according to claim 11, wherein said driver comprises:
- a permanent magnet fixedly mounted onto one of a first member and a second member and which is of a magnetic material; and
- a drive coil fixedly mounted onto the other of said first member and said second member, wherein said drive coil is positioned within a magnetic field that is generated by said permanent magnet, and wherein said drive coil generates a driving force when an electrical current is supplied to the drive coil,
- wherein said first member includes one of said stationary support and a stationary member that is fixedly mounted on said stationary support, and said second member includes said stage.

15. The electronic apparatus according to claim 14, wherein said stationary support includes a first yoke of a magnetic material,
- wherein said stationary member includes a second yoke of a magnetic material, said second yoke being provided on an opposite side of said stage from said first yoke,
- wherein said permanent magnet is fixed onto said second yoke, and
- wherein said coil is fixed onto said stage.

* * * * *